United States Patent

[11] 3,594,764

[72] Inventor Matthew John Walsh
Pittsburgh, Pa.

[21] Appl. No. 740,583
[22] Filed June 27, 1968
[45] Patented July 20, 1971
[73] Assignee NUS Corporation
Rockville, Md.

[54] ANALOG CONVERTER AND TRANSLATOR NETWORK THEREFOR
9 Claims, 5 Drawing Figs.

[52] U.S. Cl. .......... 340/347 P
[51] Int. Cl. .......... G08c 9/08
[50] Field of Search .......... 340/177, 347

[56] References Cited

UNITED STATES PATENTS 3,246,316 4/1966 Saylor .......... 340/347
3,487,400 12/1969 Ludwig .......... 340/347

*Primary Examiner*—Daryl W. Cook
*Assistant Examiner*—Jeremiah Glassman
*Attorney*—Carothers and Carothers

ABSTRACT: A telemetry system for transmitting and monitoring analog data from a remote station to a receiving station with transducer means in the form of an encoder to convert the analog signal into digital intelligence in the form of a coded signal to be transmitted over the telemetry system, preferrably over the standard switched telephone network through, for example, the application of the data phone system of the American Telephone and Telegraph Company, the intelligence being transmitted over the data phone system through the use of coded tones produced by multifrequency oscillators. A decoding network is provided at the receiving station to receive the transmitted coded signal and convert the coded signal into a signal indicative of the original analog signal.

The telemetry system receives at its input and reproduces at its output, contact indication combinations selected from a plurality of groups of possible contact indications wherein each indication represents a different analog data character or value and no more than one contact indication is normally permitted within each group for any one possible combination. Each contact indication represents a different analog value and each group of contact indications represents a different arithmetic progression of the analog values wherein the first term of each successive progression equals the last term of the preceding progression plus the common difference of the preceding progression and wherein the common difference of each successive progression is equal to its first term. The contact indications are additive for each given possible combination to provide a digital code representative of an arithmetic progression of terms corresponding to the range of analog data values to be transmitted.

INVENTOR.
MATTHEW JOHN WALSH
BY
CAROTHERS & CAROTHERS
HIS ATTORNEYS

INVENTOR.
MATTHEW JOHN WALSH
BY
CAROTHERS & CAROTHERS
HIS ATTORNEYS

INVENTOR.
MATTHEW JOHN WALSH
BY
CAROTHERS & CAROTHERS
HIS ATTORNEYS

INVENTOR.
MATTHEW JOHN WALSH
BY
CAROTHERS & CAROTHERS
HIS ATTORNEYS

INVENTOR.
MATTHEW JOHN WALSH
BY
CAROTHERS & CAROTHERS
HIS ATTORNEYS

ANALOG CONVERTER AND TRANSLATOR NETWORK THEREFOR

BACKGROUND OF INVENTION

1. Field of Invention

This invention is related to the transmission of data intelligence by means of a telemetry system which provides for reasonably accurate transmission of data but at the same time is extremely economical as compared to present data transmission systems in use. Also this invention relates to a code converter for converting an analog signal into a coded digital signal representative of the original analog signal.

2. Description of the Prior Art

There is a steadily rising need to provide an economical means or system for the transmission of data from remote areas or stations to a central station especially where periodical monitoring of the data by the use of present day transmission media is required. In this situation, there are four basic concerns in the transmission of such data.

The first of these is confirmation through the transmission of data that the data is maintaining a desired predetermined norm or range. Secondly, indication through such data transmission that the data has gone above or below the desired predetermined norm or range. Thirdly, an indication through such data transmission by what amount the range or norm has been exceeded. Fourth, self-analysis by the transmission equipment that the equipment is properly transmitting and receiving data.

A common mode today for the transmission of data from a remote station to a central receiving station is by the leasing of long distance communication lines from telephone companies. These lines are leased from telephone companies on a cost per mile per month per grade of transmission line in accordance with prevailing tariffs. The advantage of such leased lines is that data can be continuously transmitted without the necessity of interruption. However, such lines are extremely expensive to lease unless the line is being used continuously, day and night, to transmit data to a destination point. In most situations where there is a data transmission need, the need is not required on a continuous basis. In most applications involving data transmission, the time for transmission need only occurs periodically or at timed intervals and each of such transmissions occur only for a short interval of time.

If data transmission need only occur periodically for short intervals of time, rather than transmitted on a continuous basis, then the data transmission is preferably accomplished over the standard switched telephone network eliminating the need for leased lines and, thus, making provisions for periodical use of a telemetry system which is one of the most economical modes of data transmission available today.

Use of the standard telephone network for telemetry permits the use of less sophisticated equipment, the convenience of the common day availability and service of regular voice grade telephone lines, the availability of telemetry in geographical areas otherwise unaccessible or impractically accessible by other transmission modes, and the flexibility of the standard telephone system.

The data to be transmitted is normally converted into binary coded combinations of contact closures which are converted to multifrequency signals for transmission over a telephone network. Generally a number of different fundamental frequencies are simultaneously transmitted and each fundamental frequency is independently modified or modulated by the closure of a corresponding contact to provide different combinations of modulated and unmodulated frequency combinations. It is apparent with such telephone telemetry systems that no more than one contact closure may be made at a time for each different fundamental frequency or channel as only one modification of the same fundamental can be made at the same time.

Generally, data transmitted over such telephone systems is transmitted serially by the use of binary codes for conversion of the analog values to digital values. In other words, the analog values being transmitted, are transmitted bit by bit or serially, rather than transmitting the whole analog quantity at one time or parallel transmission. Serial transmission is of great advantage where the data to be transmitted is to be transmitted continuously and is voluminous and continually changing in value or is multifarious and a high degree of accuracy is required. However, none of these characteristics are applicable to the situation where analog values in remote areas need only be monitored periodically for verification and consist mostly of integers requiring accuracy only to the second or third decimal place. Serial transmission then becomes extremely wasteful as the same equipment is required even though little information is to be transmitted and then only periodically and with no requirement of transmitting integers which are accurate to many decimal places. The great amount of equipment required and its corresponding cost is not warranted by the need. Furthermore, binary codes as presently known do not take full advantage of the present day telephone telemetry systems as they demand serial transmission of data, when the telemetry system admits more practically to parallel transmission due to the ability of the system to simultaneous transmission more than one frequency tone at a time.

The ordinary decimal and binary codes presently in use are not satisfactory for telemetry on such systems as either too many individual contact closures, or too many different transmission channels are required to cover the desired range of analog values which may have to be transmitted when making only periodical verifications of conditions prevalent at a remote position. As a result, the amount of equipment required to do the task is increased and so also is the cost. It is a principal object of the present invention to provide a code which is much more flexible and adaptable to telephone telemetry than those codes known heretofore.

SUMMARY OF INVENTION

The principal object of this invention is the provision of an encoder and decoder network and code therefor, adapted for use in the transmission of analog data by means of a telemetry system such as the standard switched telephone network where there are one or more remote transmitting data stations reporting to a central receiving station.

In operation, there may be, for example, several remote stations from which data must be collected in monitoring a particular analog data source. A specific example would be the provision of several stations along the length of a river wherein at each station there is a data source provided to periodically monitor, or verify, the *p*H factor of the river water. If the *p*H factor becomes excessive, action can be taken to find the source contaminating the river and provide for its elimination in order to preserve fish and natural life found in and along the river.

The data source would comprise a sensor and an analog recorder responsive to increases and decreases in the acid content in the river, the sensor being a conventional type of *p*H meter connected to a strip chart recorder or analog recorder with its output shaft having a shaft encoder connected thereto and responsive to the positioning and changes in the position of the output shaft of the *p*H recorder. The shaft encoder has a unique arrangement of conductive and nonconductive segments or contact indications to form a code pattern on the surface of its commutated disc which rotates or moves with the data source output shaft of the recorder.

The encoder conductive segments are electrically connected to a data transmitter interface which is preferably compatible with the standard switched telephone network, such as, the data phone system of the American Telephone and Telegraph Company. The encoder disc conductive segments are connected to the data phone transmitter interface in accordance with the selection of the code pattern on the disc to close and open contacts within the data transmitter, which closures in the data transmitter are converted into multifrequency signals for transmission over the standard switched telephone network. A combination of different data characters can be transmitted by combining several such multifrequency signals upon appropriate contact closures being made at the data transmitter interface through the shaft encoder network. The combination of the multifrequency signals will be indicative of one such data character determined by the code pattern on the shaft encoder disc which, in turn, is indicative of the position of the encoder disc relative to the displacement of the output shaft of the *p*H meter or analog recorder at the data source. Thus, the data source output shaft represents a servopositioning of the encoder disc. Movement of the data source output shaft responsive to changes at the data source, such as the change in the *p*H level of the river as given in the example above.

The servopositioning of the data source output shaft represents a variable quantity, the measurement of which is dependent upon its relative rotary position and the code pattern on the shaft encoded disc. Contact closures at the data transmitter interface are indicative of the shaft encoder disc displacement which converts this displacement into a multifrequency signal. The multifrequency signal is transmitted over a telemetry system, as for example, the switched telephone network, and it is received at the central station by a data receiver, the multifrequency signals being received by frequency sensitive circuits for demodulation and separation to reproduce the contact signals used in modulation at the data transmitter. These signals may then be used to operate in conjunction with a decoding network which comprises one principal feature of this invention. A data receiver interface is provided on the data receiver to which is connected the decoding network which converts the signal into the desired analog value and this is in turn fed into an analog data indicating device, such as, a voltmeter. In the example given above the analog data indicating device would be in the form of a *p*H meter indication.

The decoding network operates to retrieve the original analog signal as follows. The transmitted multifrequency signals provide appropriate contact closures at the data receiver interface and represent congruent patterns of the original contact closures transmitted from the data receiver. The various possible combinations of contact closures are provided in a circuit system within the decoding network providing resultant discrete voltage levels indicative of the displacement values of the encoder disc. The voltage levels, thus, become indicative of the incremental radial positions of the encoder disc relative to the positioning of the wiper contacts in engagement therewith comprising the fundamental operation of the shaft encoder. The level output then may be fed into an analog indicating device which indicates visually the output level.

In the example given previously, the output level may be indicative of the *p*H level of the river water at any one of a number of remote stations located along the length of the river.

It should be understood that the encoder and decoder network is not limited to the employment of the switched telephone network of the telephone companies since other data transmission media may be employed, such as for example, radio frequency transmission and the now-being-developed laser beam transmission. The analog-to-digital converter of the present invention also need not necessarily by employed in a telemetry system; it may be used for any other suitable purpose such as a computer input.

By the same token, transducer means other than the conventional encoder device can be employed for the purpose of converting the analog signal into a signal to be received by the data transmitter interface. For example, photosensitive devices may be arranged in a desired code pattern and electrically connected to the data receiver interface. The analog signal would be represented by a varying light source or multilight emission source which would energize selective photosensitive devices which in turn would make appropriate contact closures at the data transmitter interface in the same manner as previously explained.

Another principal feature comprising the present invention is the provision of an analog-to-digital converter having a preselected pattern of characters recorded on an element of the converter in a series of tracks. The converter element may be the shaft encoder disc of a shaft encoder as mentioned above. The preselected pattern is represented on the converter element in the form of signal contact means or contact indication in each of the tracks and means is provided for sensing these signal contact means to produce output signals indicative of the position of the converter element relative to the sensing means.

In the particular application disclosed herein the tracks are divided into a plurality of groups on the converter element and each track represents a different analog character or value such as different integers. The groups of tracks respectively represent successive arithmetic progressions of the analog values wherein the first term of each such successive progression equals the last term of the preceding progression plus the common difference of the preceding progression and the common difference of each successive progression is equal to its first term.

A major characteristic of the analog-to-digital converter disclosed herein is that the contact indications or signal contact means arranged in each of the tracks on the converter element is arranged in such a manner that normally no more than one integer or analog value represented by each track, can be sensed by any one of the sensing means in any one of the groups of tracks at any given position of the converter element relative to the sensing means.

The represented values of output signals of each of the groups of tracks are additive at any given possible instance of positioning of the converter element relative to the sensing means to provide a digital code representative of an arithmetic progression of terms which correspond to the range of analog values to be converted for transmission over the telemetry system.

The sensing means in a converter of the analog-to-digital type may be of any suitable character which is compatible with the nature of the transducer selected. In the converter element of the shaft encoder type, the sensing means are normally a plurality of electrical wiper brushes or contacts one for each sensor track. The shaft encoder commutator disc and the wiper contacts are supported for movement relative to each other.

As indicated previously the preferred form of the analog-to-digital converter comprising the present invention is a digital encoder for converting the analog quantities received as a signal from the analog data source which encoder has a code pattern arranged on one surface of its commutator disc, the code pattern being preferably representative of integers from 0 through 99. The code pattern is divided up into a plurality of code groups each of such groups comprising a series of sensor tracks on the commutator disc surface. Each sensor track is provided with one or more electrically connected conductive segments. Those areas of the sensor tracks not provided with conductive segments are represented as nonconductive segments. The code pattern is segmented into 100 discrete positions on the commutator disc with the conductive segments arranged in such a manner as to provide a successive series of arithmetic progressions which additively combine sequentially with each discrete position to represent integer values from 0 to 99. The integer value at any one position of the commutator disc relative to the wiper contact is registrable by the series of wiper contacts. However, not more than one wiper contact in any one of the groups of sensor tracks will normally be on a conductive segment at any one time or position of the wiper contact relative to the commutator disc. This particular point comprises a unique feature in the code pattern arrangement of the analog-to-digital converter disclosed herein.

From the foregoing is readily realized that the analog-to-digital code as taught herein, in and of itself constitutes another major object of the present invention. The analog-to-digital converter merely requires any suitable means to provide contact indication combinations indicative of the analog data being converted and selected from a plurality of groups of possible contact indications wherein no more than one contact indication is normally permitted within each group for any one of the said combinations. In summary, this converter is characterized by a code which requires that each of the contact indications represent a different analog value, and the groups of possible contact indications respectively represent successive arithmetic progressions of the analog values wherein the first term of each successive progression equals the last term of the preceding progression plus the common difference of the common difference of the preceding progression and wherein the common difference of each successive progression is equal to its first term. The represented values of the contact indications for each given possible combination are additive to provide a digital code representative of an arithmetic progression of terms corresponding to the range of analog data values being converted. The code of the present invention is uncommonly flexible to meet the needs of each different situation. The first term of the first progression may be chosen at will as any desired value and so also may its common difference. Furthermore, each progression may be ended with the term desired or which the system may call for and as many different groups or progressions may be easily provided or calculated as required to lengthen or shorten the range of analog data to be converted.

Another object of the present invention is the arrangement the different groups of tracks concentrically and sequentially on a commutator disc according to their respective common difference with the group of the highest common difference positioned closest to the center in order to obtain the greatest degree of resolution and definition as the higher the common difference is, the lower the switching frequency of contact indications is.

In the telemetry system comprising the present invention, a decoding network is provided to retrieve the coded signal and to translate the coded signal into a signal indicative of the original analog signal. The decoding network is found at the receiving station, the point of destination of the original analog signal. Basically, the decoding network comprising this invention is an electrical circuit comprising a plurality of resistances, each of which is connected to a switching element responsive to a contact closure accomplished in the data receiver at the receiving station. The incoming digital signal is received at the receiving station by the data receiver which is responsive to the signal in such a manner as to indicate at the data receiver output a combination of selected contact indications which are in the form of contact closures, each of which is connected with the decoding network. A combination of contact closures from the data receiver close the switching devices which are representative of these contact closures and which in turn permit corresponding voltage drops across selected of the resistances in the decoding network. These voltage drops are indicative of the value of the original analog signal as coded by the analog-to-digital converter at the data input source. The signal from the decoding network may then be fed to an analog indicating device which will be representative of the original analog signal developed at the analog data source. The analog indicating device may be any form of device which visually or graphically illustrates the original analog signal such as a voltmeter or current meter. In the example given above the analog indicating device may be scaled in the form of a *p*H meter indicating the *p*H factor at any point along the river which is being monitored by the telemetry system comprising this invention.

The translating circuit may either provide additive voltage drop combinations in accordance with the code of the present invention or it may provide additive combinations of current flow in accordance with the code to reproduce a signal representative of the original analog signal.

Another object of the present invention resides in the selected permission of more than one contact indication in each group of encoder tracks at any one given time to provide additional possible contact indication combinations which may be employed to transmit other related information such as alarms, station identification, or location.

Other objects and advantages appear hereinafter in the following description and claims.

The accompanying drawings show for the purpose of exemplification without limiting this invention or the claims thereto certain practical embodiments illustrating the principles of this invention wherein:

Figure 1:
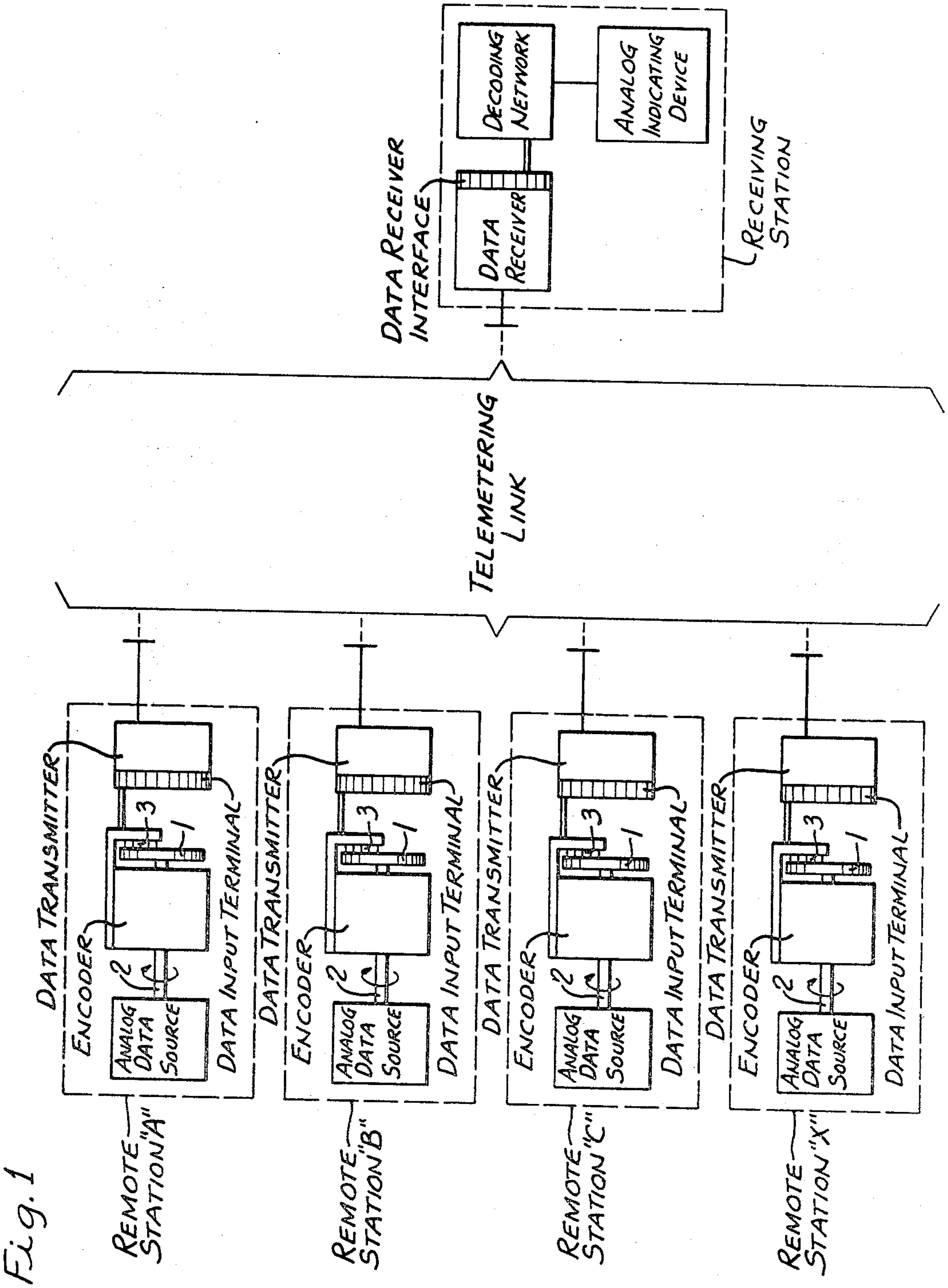
FIG. 1 is a diagrammatic view of the telemetry system comprising this invention.

Referring to the telemetry block diagram of FIG. 1, the telemetry system illustrated consists of a plurality of remote stations A, B, C, and so on through X, from which desired intelligence is transmitted via a telemetering link to a central or receiving station where the information can be utilized. The intelligence to be transmitted is originally in the form of a voltage known other wise as an analog signal, the magnitude of which is related in some predetermined manner to the data to be transmitted.

For example, the analog data to be transmitted might be the *p*H factor of water found in the locality of the remote stations. This data is measured by a *p*H meter and is generally recorded at the remote stations by an analog recorder.

Thus the *p*H meter together with the analog computer and recorder would constitute the analog data source of each of the remote stations indicated. The analog data source is connected to an encoder which converts the analog data into a digital code for transmission by the telemetering link to the receiving station.

The encoders illustrated in FIG. 1 are shaft position encoders which operate from rotating shafts 2, as indicated by the arrows, from the analog data source. The shaft, for example, might be the analog recorder shaft. The encoder is basically a device for converting the analog data in the form of an annular shaft position into digital data. This digital data may take on many different energy forms such as contact closures, voltage levels or other contact indications which may be recorded on any suitable element or coded pattern member such as a solid disc or a continuous belt or a magnetic tape. The contact indications may be recorded on the element by any suitable means such as by prearranged metallic surfaces or magnetic recording or by the use of windows when a photoelectric or light sensing means is employed as the means of sensing the contact indications.

For simplicity, the sliding contact encoder which employs a preselected pattern of metallic surfaces on an element or coded pattern member and associated brushes which make sliding contact with the metallic surfaces over the element as the readout or sensing means for the coded pattern member is discussed.

The coded element is divided into a number of positions wherein each discrete position is defined by a unique combination of contact closures or contact indications. The element and its associated brushes are moved or slid relative to each other in accordance with the encoder shaft which moves in proportion to the analog output signal. The encoder elements of FIG. 1 are illustrated as coded discs 1 which are connected for the same or proportional angular rotation with the analog data source shafts 2.

The contact brushes 3 are mounted stationary relative to the coded disc 1 to permit relative movement therebetween. The contact brushes 3 are permitted to slide over the surface of the disc 1. The metallic pattern on the surface of encoder disc 1 provides a unique combination of contact closures with the brushes 3 for each discrete shaft position.

These unique combinations of contact closures are presented to the data input terminals of a transmission-reception means which receives the contact indications at its input. The digital information is then transmitted by means of the data transmitters over the telemetering link to a data receiver at the receiving station where the original data in the form of contact indications or closures is reproduced at the data receiver interface.

The small voltages supplied at the input interface of the transmitter are generally alternating current and therefore are converted to direct current to save the contacts or brushes, engineering costs and time. Furthermore, the antiambiguity logic circuits employed with encoders, generally require a DC input. These circuits are discussed hereinafter.

The telemetering link in this instance may constitute modulated radio waves or light waves or modulated or modified waves transmitted by any suitable transmission line or wave guide.

The contact indications or signal contact means are then received by the decoding network which decodes the digital information and reproduces the original analog data transmitted from each analog data source. This information is then indicated or recorded by the analog indicating device for further use or reference.

Depending upon the ability of the transmission-reception means between the remote stations and the receiving station, the information from each individual remote station may be either received simultaneously or sequentially or individually as selected.

For convenience, a transmission-reception means which continually transmits fundamental audio frequency tones and which further provides modifications of these fundamental tones in response to appropriate contact closures by the encoder will be discussed.

Figure 2:
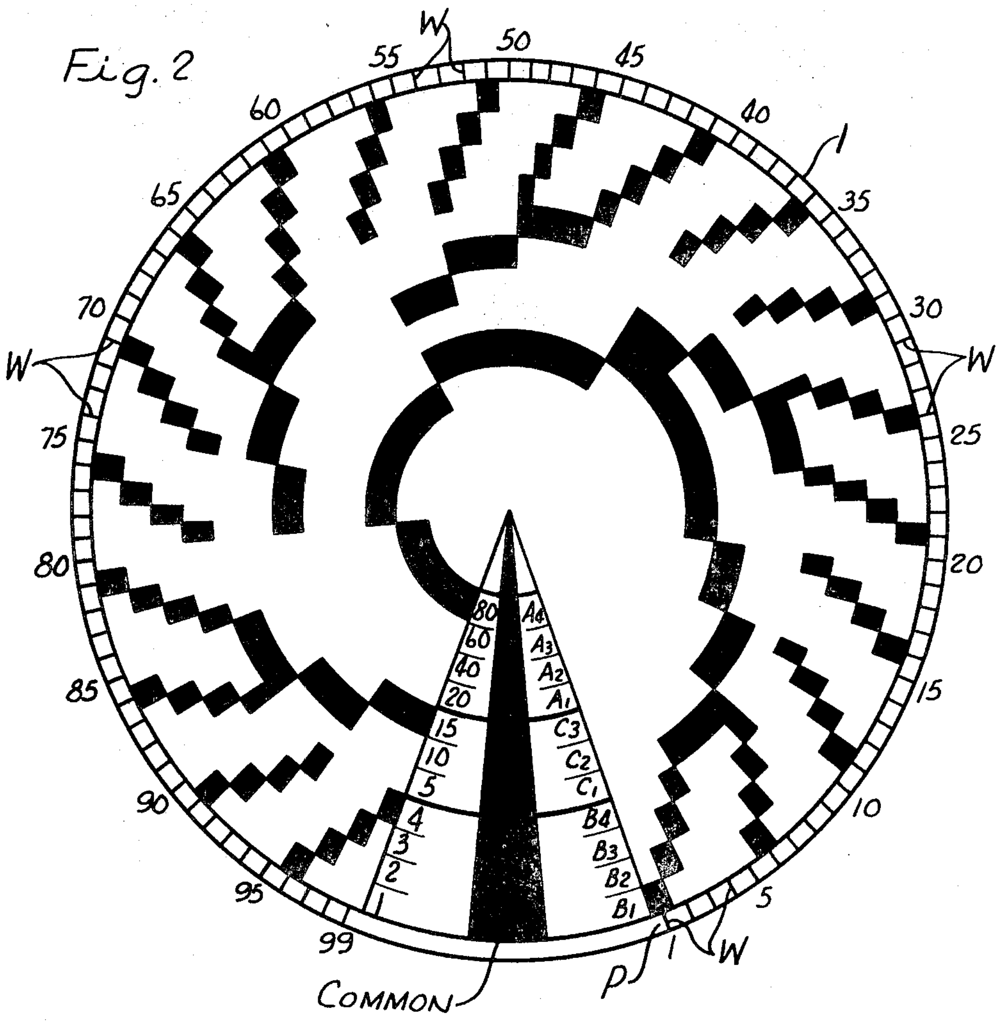
FIG. 2 is an enlarged view of one embodiment of a commutator disc of an analog-to-digital converter used in the telemetry system comprising this invention.

FIG. 2 illustrates the encoder disc or element of one example in detail. The example encoder disc shown is made of etched circuit material with the conducting surfaces, indicated by the larger darkened areas, covered by a precious metal plating and planished to present a smooth surface. Epoxy or phenolic-based plastics are generally used for the basic disc material.

The element 1 may be said to have a preselected pattern of binary characters (go and no-go signals) recorded in tracks thereon by the selected presence and absence of a signal contact means. The contact means in this instance consists of actual electrical contacts provided by the metallic surfaces patterned on the disc surface.

Thus, a binary character of one type would be represented by the presence of the metallic surface and the binary character of the other type would be represented by the absence of the metallic surface as sensed by a brush or brushes passing over the coded surface. However, the code of the present invention is not binary in the sense that powers of the numeral two are additively combined.

As stated, these binary characters are recorded in tracks on the element. In FIG. 2, the tracks are annular and concentric. The element 1 of FIG. 2 is provided with 11 tracks; namely, tracks A1 through A4, tracks B1 through B4 and tracks C1 through C3.

It should be realized that these tracks need not be annular. The element 1 may consist of an endless belt having the aforementioned tracks positioned in straight lines in parallel to each other as just one example.

Figure 3:
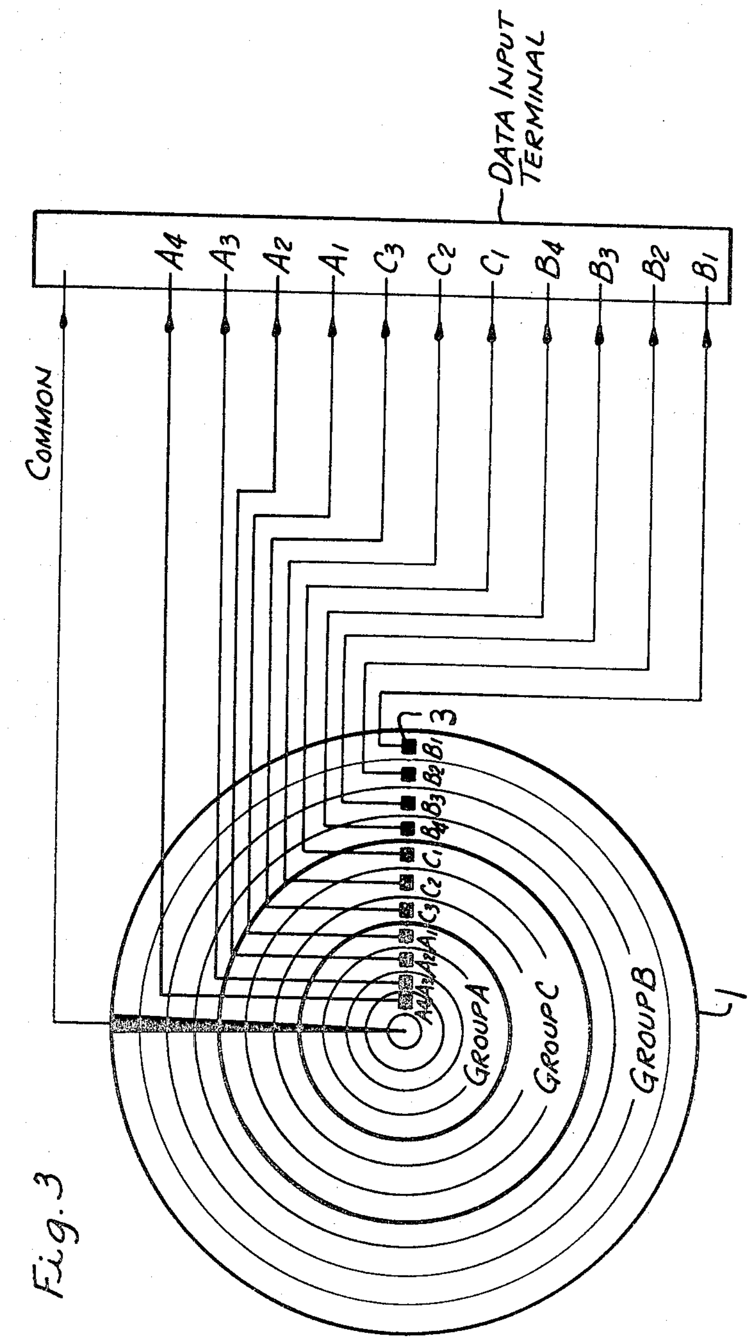
FIG. 3 is a schematic diagram of the circuitry connecting the commutator disc of FIG. 2 to the data input terminal of the data transmitting means of the telemetry system.

Means for sensing the signal contact means or the presence or absence of the metallic surface is provided in each track by the brushes or wiper contacts 3 which are shown in greater detail in FIG. 3. One brush is provided for relative movement along each track such that a contact closure is made when the respective brush engages the metallic surface at a given angular position of the element 1.

The many metallic surfaces indicated by the darkened portions found within the annular track are commonly connected to the common terminal as indicated. A contact closure is therefore made in each track when its respective brush completes the circuit to the common terminal as best illustrated in FIG. 3. The darkened contact areas shown on the disc 1 of FIG. 2 are not shown in FIG. 3 for the sake of simplicity. FIG. 3 is merely meant to be a diagrammatic sketch for the purpose of illustration.

The brushes provide a means for sensing the signal contact means or indications in each track in accordance with an analog signal to be converted to produce output signals indicative of the position of the element 1 relative to the sensing means or brushes 3 in this given instance.

As best illustrated in FIG. 2, the aforementioned tracks are divided into a plurality of groups. In this particular instance the groups are represented by *A*, *B*, and *C*, respectively. The *A* and *B* groups each consist of four tracks whereas the *C* group consists of three tracks.

Each track is permitted to represent a different analog character or integer in this case. In this instance tracks B1 through B4 represent integers 1 through 4, respectively, as indicated in FIG. 2. Tracks C1 through C3 represent integers 5, 10 and 15, respectively, whereas tracks A1 through A4 represent integers 20, 40, 60 and 80, respectively.

It can be readily seen that these groups respectively represent successive arithmetic progressions of the integers wherein the first term of each successive progression equals the last term of the preceding progression plus the common difference of the preceding progression. The common difference is defined as the integer increment between adjacent integers of a progression. Thus the common difference of the *B* group is 1 whereas the common difference of the *C* group is 5 and that of the *A* group is 20.

As further explanation, the last term of the *B* group arithmetic progression was selected as the integer 4 and the progression was provided with a common difference of 1, i.e., an increment of one appears between adjacent integers or terms of the progression. Thus the first term in the succeeding progression, which in this instance, is the *C* group, must equal the last term of the preceding progression, which in this instance is the integer 4, plus the common difference of the preceding progression which in this instance is 1. Thus the first term of the *C* progression is therefore 4 plus 1 or 5.

The second characteristic of the code is that the common difference of each successive progression is equal to its first term. For example, the successive progression to that of the group *B* progression in this particular example is the *C* progression and its first term being 5, it has a common difference of 5. The last term of the *C* group in this instance was selected as 15 and therefore the first term of the next succeeding group or in this instance the *A* group progression must be 20 or 15 plus 5 as 15 represents the last term of the preceding progression plus the common difference of the preceding progression.

As indicated in FIG. 3 the brushes 3 are arranged on a common radius of the element 1. It should however be noted that the brushes may be arranged on a different pattern provided that the signal contact means on the element 1 are rearranged in accordance with the layout pattern of the sliding contacts or brushes.

These signal contact means, in this instance the metallic surfaces, are arranged in their respective tracks such that no more than one represented analog character can be sensed by the sensing means or brushes in each group at any given instance of relative movement between the element and the brushes. In other words, it should be noted that if the brushes are provided on a common radius with one brush positioned over each annular track and the element 1 is rotated relative to the brushes, no more than one contact closure will be made in each group at any discrete position of angular movement.

The analog characters represented by the sensed output signals of the respective groups are additive at each given possible discrete position of angular movement or instance of relative movement between the disc and the brushes, to provide a digital code representative of an arithmetic progression of terms which correspond to the range of analog values to be converted. In the particular example of FIG. 2, 320° of angular displacement of the encoder element 1 and its respective encoder shaft 2 is all that is required for the full scale output of the analog data range to be converted. The coded disc or element 1 is divided into 100 discrete positions wherein each discrete position is defined by a unique combination of contact closures. In this instance, the 100 discrete positions represent integers 0 through 99 or 1 through 100, whichever is preferred.

To determine the representative integer from one particular contact closure combination, one merely adds the integers simultaneously detected from each group together. For example, if the relative movement between the brushes 3 and the element 1 is such that the brushes lie on a common radius which runs through discrete position 99, then it can be readily seen that a contact closure will be made in track 4, track C3, and in track A4. To obtain the integer 99 one merely adds the integers represented by these three tracks together.

The analog information is therefore converted into digital signals which can be easily and periodically transmitted on command to a receiving station where the process is reversed and the digital information is decoded to its original analog values.

As an example of one form of transmission reception means which is readily employed in this telemetry system, a coded tone system which employs conventional telephone transmission lines is hereinafter described. It should be understood, however, that the same transmission techniques may be provided to any other practical transmission waves such as light beams and radio waves.

The coded tone transmission reception means is provided with a frequency generator means which simultaneously generates a different fundamental frequency wave or tone for each group of tracks and these fundamental tones are continuously transmitted over the conventional telephone transmission lines to the receiver positioned at the receiving station.

For the particular code pattern indicated in FIG. 2, the simultaneous transmission of all three basic or fundamental tone signals at the same time would indicate the absence of any contact closures within any group of tracks. Each of these fundamental tones may be represented by the symbol $A_0$, $B_0$ and $C_0$ for each of the three *A*, *B*, *C* groups, respectively. The transmission of fundamental tones $A_0$, $B_0$ and $C_0$ simultaneously may thus represent integer 0 or 100 as desired.

As previously stated, only one contact closure or indication is normally permitted in any one group at one given discrete position of angular displacement. A contact closure in any one track will modify its respective fundamental tone $A_0$, $B_0$ or $C_0$, to provide a different and unique tone which is representative of the one track within which the contact was made and therefore also representative of its corresponding analog character or integer to which it was designated.

As an example, if the brushes were positioned on a common radii running through discrete position 85, no contact closures would be made in group *B*, however, a contact closure would be made in track $C_1$ of group *C* and in track $A_4$ of group *A*. Thus the transmission reception means would transmit simultaneously the fundamental frequency $B_0$, tone frequency $C_1$ which is a modification of $C_0$, and tone frequency $A_4$ which is a modification of fundamental frequency tone $A_0$. To illustrate how this is readily accomplished, a separate oscillator circuit can be visualized for each fundamental tone. Each of these oscillator circuits would have one large coil which would permit the generation of the fundamental frequency $A_0$, $B_0$ or $C_0$. The contact closures of each group may then be utilized to tap into the coil intermediate its ends. A portion of the fundamental coil is rendered unusable thereby changing the coil length and frequency characteristics to provide a modified tone or signal.

Each group is therefore provided with its own transmission channel through which a fundamental wave is transmitted and each track is represented by a different modification or modulation of the fundamental frequency of its respective channel.

To state the operation of the particular telemetry system described in connection with FIGS. 2 and 3, the telemetry transmission reception means provides 14 circuits divided into three groups which are known as *A*, *B* and *C*. Two of these groups contain five circuits, namely groups *A* and *B*, and the third group contains four circuits. The five circuits of group *A* and of Group *B* would be $A_0$ through $A_4$ and $B_0$ through $B_4$, respectively, and the four circuits of group *C* are represented by contact circuits $C_0$ through $C_3$. Each of the 14 circuits produces a unique audio frequency tone.

One channel in each group, namely $A_0$, $B_0$ or $C_0$, is arranged to generate a fundamental tone continuously. Each of the other three or four channels in each group, generates its individual tone by modifying the fundamental in a definite way. Thus, only one channel in each group may be activated at a time, but the three groups may be activated simultaneously. This method of operation or transmission is designated as "3 out of 14."

The three simultaneous audio frequency tones are then transmitted over the telephone system upon command to the receiving station, where an appropriate receiver accepts the three simultaneous tones and by means of frequency sensitive circuits, causes corresponding contacts to close, reproducing exactly the pattern used at the transmitter or a proportionate pattern. Such telephone transmission-reception means generally accepts contact closures or input signals which provide a load of 10 ohms or less across any of its inputs. Thus in this example, any load of 10 ohms or less is known as a contact closure and acts as a shunt across a portion of the oscillator coil of the particular groups *A*, *B* or *C* thereby changing its frequency output.

Many other means are available to provide such contact closures as for example by providing the element or disc 1 with photosensitive resistors arranged in a like manner, such that when light strikes the photosensitive resistor, the resistance of the photosensitive resistor would become less than 10 ohms to provide a contact closure or a contact indication. Thus, depending upon the transmission-reception means employed in the telemetry system any signal contact means may be employed which will suitably indicate the presence or absence of the signal contact means as previously described.

Referring particularly to FIG. 2, the outermost ring or track P represents an antiambiguity logic ring commonly employed with disc encoders which do not utilize a monostrophic or syncopic code.

A monostrophic code requires that only a signal bit may change when passing from any discrete position to an adjacent discrete position. The code of the present invention is not monostrophic. As a shaft encoder cannot be constructed so mechanically perfect that two or more brushes will go on or off simultaneously, means must be provided to eliminate ambiguous or erroneous output created at the transition period between discrete positions where brushes that should be on are off or vice versa.

To eliminate this problem the outer track or ring P is provided with a window code whereby a window W, such as a contact surface or an opening, is provided at each discrete position of angular movement. This antiambiguity ring provides a form of electrical detenting whereby readout is permitted only when this contact is on as by the contact of another brush on the same radius as the other brushes 3 or by the transmission of light through the respective window W. To provide continuous data, the encoder is connected to a storage circuit that follows the information sensed by the sensing means when the window is on and stores this information when the window is off. Therefore if the angular position of the element 1 is such that the brushes lie between adjacent discrete positions, the storage circuit will provide contact indications corresponding to the last discrete position sensed by the sensing means or brushes when the respective window was on. Such antiambiguity logic is commonly known in the art.

When a disc type element such as shown in FIG. 2 is employed, the track groups *A*, *B* and *C* are concentrically and sequentially arranged according to their respective common differences such that the group having the highest common difference is positioned closest to the center of the disc. Here the *A* group has a common difference of 20, the *C* group 5 and the *B* group 1 and they are therefore arranged in this sequence with reference to the center of element 1. This allows the best possible definition and resolution as the switching frequency of the group closest to the center of the disc is smaller or less than that of the any of the remaining groups.

For example, the *A* group is switched four times over the incremental range of 0 to 99 and the *C* group is switched 15 times over the same range whereas the *B* group is switched 80 times over the range.

The 100 discrete positions need not be laid out as shown on the element 1 in FIG. 2. If desired, the 100 discrete positions may use the entire 360° of the element 1 or any number of degrees thereof. As an alternative, the disc may be divided into more or less than 100 discrete positions as the individual may desire or the analog equipment may dictate.

As another example, 100 discrete positions may be employed and spread throughout the full 360° of the element 1 and one full revolution of the element 1 may represent only a fractional portion of the full analog range of values which may be transmitted from the respective remote station to the receiving station. This is accomplished by providing a gear reduction between the analog output shaft 2 and the shaft of the encoder disc 1. A revolution detection means or detector is provided which counts each full revolution of the element 1 thereby indicating incremental changes in the unit series from 0 to 99 and the hundred series from 100 to 199 and the 200 series from 200 to 299 and so on such that each full successive revolution represents a successive arithmetic progression. In other words, in this case of continuous rotation, the 0 to 99 bit code would be placed over 360° with a secondary circuit to count the number of completed rotations.

The transmission capabilities of the telemetering system herein described can be further expanded by shorting out or muting one group or fundamental oscillator completely and modulating only the remaining two. Likewise further information contact closure combinations may be provided by muting or shorting out any two fundamental oscillators and modulating the remaining oscillator. Furthermore, all three fundamental tones or frequencies may be muted to provide one further additional circuit which would be available for the transmission of an information bit. For example; if the *A* group were muted, the remaining *B* and *C* groups would give ($B=4$) times ($C=3$) equals 12 additional circuits for control. Likewise, if *B* were muted there would be ($A=4$) times ($C=3$) equals 12 more circuits available and similarly, by muting group *C* there would be ($A=4$) times ($C=3$) equals 12 more circuits.

The additional circuits available would be as follows:

| | Functional | Available circuits |
|---|---|---|
| Mute: | | |
| A | B+C | 12 |
| B | A+C | 12 |
| C | A+B | 16 |
| AB | C | 4 |
| AC | B | 4 |
| BC | A | 4 |
| ABC | | 1 |
| Total | | 53 |

As indicated, 53 additional circuits can be achieved by manipulating the muted circuits. These circuits can be used for a variety of purposes such as alarms, geological location, identification, etc. This may be done for example by an encoder disc which permits more than one contact closure in a group. This has the effect of grounding out the fundamental frequency coil which is therefore muted. The remaining fundamental frequency tone coils may then be employed to transmit additional information.

As previously explained in connection with FIG. 2, integers of 0 through 99 can be obtained by selecting and adding together no more than one value from each of the *A*, *B* and *C* groups wherein only one contact closure from each group at a time is permitted. The 0 level groups ($A_0$, $B_0$ and $C_0$) are represented by specific circuits in the data set. In the encoder, however, a 0 in any group is represented simply by the absence of any contact closure at the transmitter. For example, the integer 30 equals $A_1$ plus $B_0$ plus $C_2$ which in turn equals by representation integer 20 plus integer 0 plus integer 10, respectively.

For the purpose of analysis, the three different arithmetic progressions represented on the coded surface of the element 1 as shown in FIG. 2, may be illustrated in table form as follows:

TABLE 1

| B | C | A |
|---|---|---|
| 1 | 5 | 20 |
| 2 | 10 | 40 |
| 3 | 15 | 60 |
| 4 | | 80 |

In this manner it can be readily seen that groups *B*, *C* and *A*, respectively, represent a series of successive arithmetic progressions of integers wherein the first term of each successive progression equals the last term of the preceding progression plus the common difference of the preceding progression and wherein the common difference of each successive progression is equal to its first term.

In selecting the desired successive progressions of integers which one wishes to employ for a given application, 0 is discounted in each progression as the integer 0 is represented merely by the absence of an output signal for any one of the three groups. Table 1 shows that the first progression, namely the *B* group, has the integer 1 selected as its first term. Therefore, following the principles of the present invention, the common difference of the first or *B* group progression will be 1. As such, the increment between adjacent integers is 1 so that the integers in the progression follow progressively as 1, 2, 3 and 4.

Numeral 4 was selected as the last term of the progression. However, the first progression or any progression may be stopped or ended at any desired integer. In other words, this first progression or *B* progression could have been ended with any other term other than numeral 4 if so desired. Numeral 4 having been selected, the first term of the next succeeding progression, namely the *C* progression, must be 4 plus the common difference of the preceding progression *B* which is 1 giving a result of 5.

Progression *C*, therefore, having a first term of 5 must also have a common difference of 5 as is shown. Here again this progression need not be ended at the numeral 15 and could have been carried out to any desired integer or term of the progression.

In a similar manner, the present invention teaches that the first term of the third progression, namely the *A* progression, must be that of the last term of the preceding progression which in this instance would be numeral 15 of the *C* progression, plus the common difference of the *C* progression which is 5, giving a result of 20. Numeral 20 being the first term of the third or A progression, 20 is also the common difference of that progression. Here again, this progression may be ended wherever desired.

It can be readily noted that if no more than one integer selection is permitted from each of the groups at one time that an arithmetic progression of integers ranging from 0 to 99 may be developed by utilizing all possible combinations additively between the groups. Numeral 0 is produced by making no selection in any of the three groups and numerals 1, 2, 3 and 4 may be produced by making no selections in groups *C* and *A* and sequentially selecting integers 1, 2, 3 and 4 from group *B*.

Similarly, numeral 5 may be produced by making no selection from groups *B* or *A* and selecting the first term of group *C*; whereas, numeral 6 would be produced by making no selection from group *A* but selecting the first terms of both groups *B* and *C*. The combinations being additive, numeral 6 is produced. The process is carried on to obtain numerals 7, 8 and 9 in a similar manner whereby the first term of group *C* in combined with the second third and fourth terms of group *B*, respectively, to additively obtain successive integers. In this manner, it can be readily seen how the process is continued until the highest integer obtainable, namely 99, is obtained by additively combining the last terms of all three groups.

Table 2 indicates how two groups alone might be utilized to obtain a final arithmetic progression from additive combinations of the groups to obtain integers 0 through 15.

TABLE 2

| A: | B |
|---|---|
| 1 | 4 |
| 2 | 8 |
| 3 | 12 |

In this particular illustration, group *A* is selected as the first arithmetic progression of the series and *B* is selected as the second arithmetic progression which may be intercombined to obtain a final arithmetic progression corresponding to the range of analog values, in this instance from 0 to 15, to be converted.

Here again, the first term of the first progression, namely the *A* progression of Table 2, has been selected as 1 and the common difference of this progression is therefor also 1. The last term of the progression has been selected as 3 and therefore the first term of the succeeding progression, namely the *B* progression of Table 2, is 3 plus 1 or 4. The first term of the *B* progression being 4, the common difference of progression *B* must also be 4. The last term of the second progression was selected as 12; however, the last term could have been any other integer in the progression which one so desires.

Here again the integer 0 is represented by no selection at all from either group and integers 1, 2 and 3 are produced by making no selection from group *B* but by selecting the first, second and third terms of group *A* successively. Numeral 4 is produced by making no selection from progression *A* but selecting merely the first term of progression *B* and integers 5, 6 and 7 are produced by making a selection of the first term of progression *B* and additively combining it with successive selections of the first, second and third terms of group *A* respectively.

Table 3 illustrates another variation for digital code representation according to the present invention.

TABLE 3

| A | B | C | D |
|---|---|---|---|
| 2 | 8 | 32 | 128 |
| 4 | 16 | 64 | 256 |
| 6 | 24 | 96 | 384 |

Here the first term of the first group progression, namely the *A* progression, was selected as 2. Therefore, the common difference of the *A* progression is 2 and the progression continues 2, 4, 6, etc. However, the last term of this progression was selected as numeral 6, therefore, the first term of progression *B* is numeral or integer 8 which is also the common difference of the second progression, namely the *B* progression. Thus the groups may be additively combined to obtain a final arithmetic progression of numerals 2 to 384.

Figure 4:
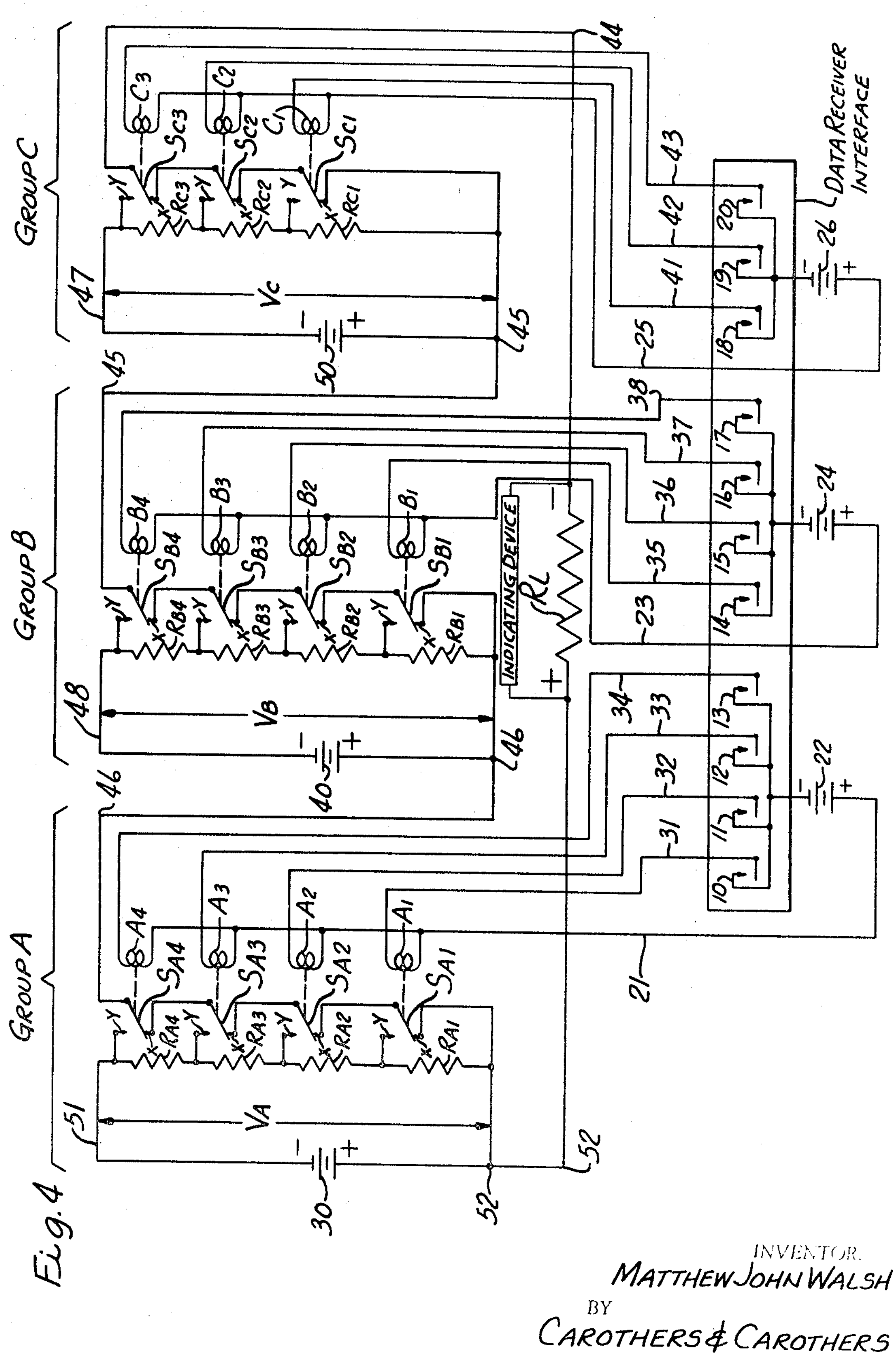
FIG. 4 is a schematic diagram of one embodiment of a data retrieval circuit for the decoding network of the telemetry system of the present invention.
Figure 5:
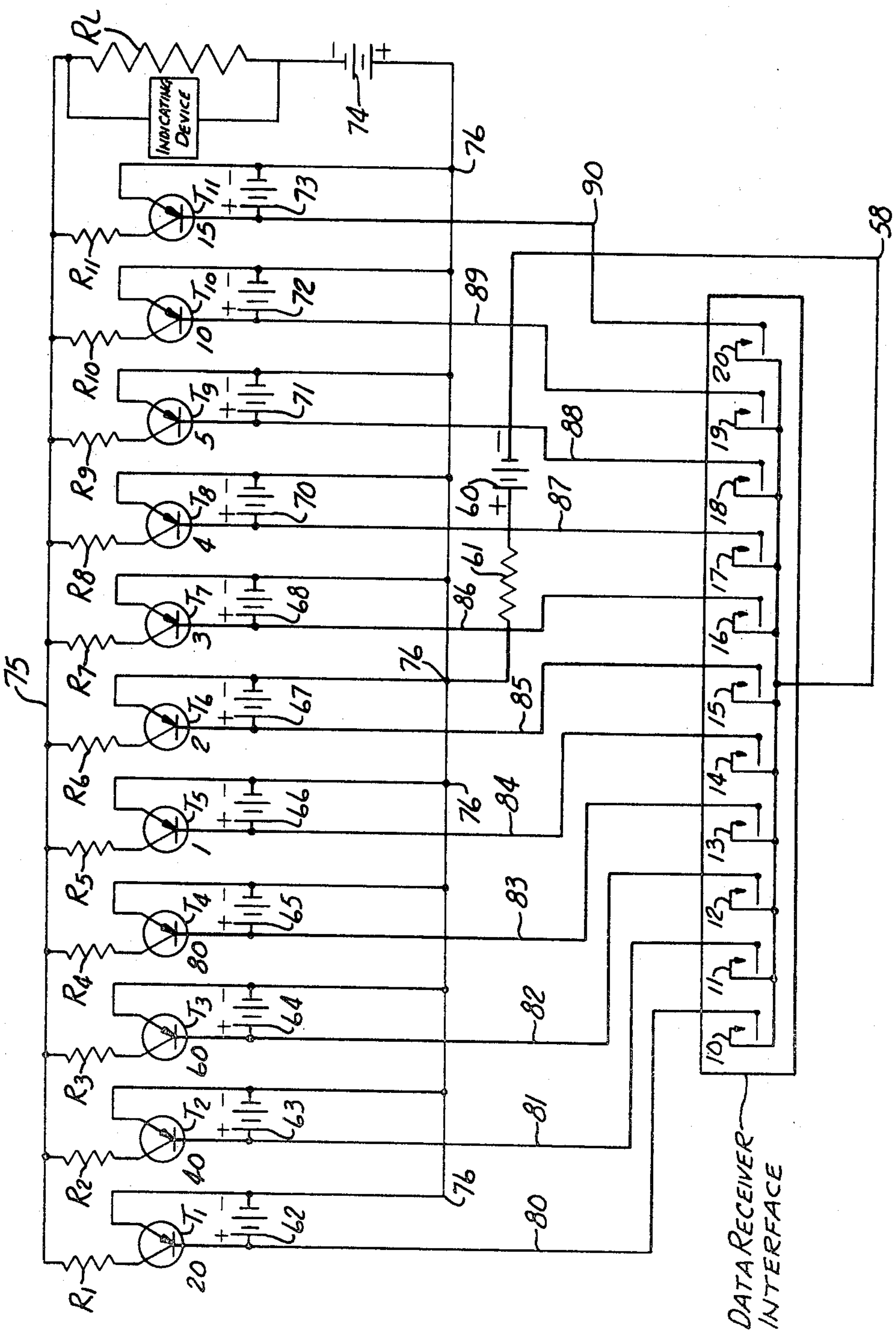
FIG. 5 is a schematic diagram representative of a modified form of a data retrieval circuit that may be used as a decoding network.

FIGS. 4 and 5 are integrated decoding networks and represent part of the receiving station as depicted in FIG. 1.

In FIG. 4 there is shown a decoding network which comprises two circuit phases, one being the data receiver output selection circuit and the other being the data retrieval circuit. Thus, the decoding network as a whole represents a translator circuit which receives transmitted signals such as those over a telephone network which are then analyzed by means of the signal detector circuitry found in the data receiver to produce simultaneously but selectively a series of contact closures, each such closure being indicative of one component or frequency as transmitted over the telemetry system as a multifrequency signal. These contact closures are part of a closed circuit representing the data receiver output selection circuit and are connected in series with a voltage supply together with their respective switching means which may take the form of a relay, or solid-state device such as a transistor, or silicon controlled rectifier. The translator circuit also includes the data retrieval circuit which is designed to produce an output signal indicative of the information character represented by the transmitted multifrequency signal in accordance with the code of the present invention.

Referring to FIG. 4 there is shown the data receiver interface within which there is represented a series of contact closure elements 10 through 20, each of which, when closed, represents one of the component frequencies of the transmitted multifrequency signal combinations possible.

It should be noted that contact closure elements 10 through 13 are in one group and contact closure elements 14 through 17 are in a second group and contact closure elements 18 through 20 are in a third group. Thus there are four contact elements in the first and second mentioned groups whereas there are only three contacts in the third group. It will be readily seen that this group combination is consistent with the group combination found on the encoder disc 1 in FIG. 2 and as depicted in FIG. 3.

As explained previously, if a contact closure is made through $A_3$ to the data input terminal of the data transmitter, a component frequency will be transmitted over the telemetering link whereby the signal is received at the receiving station and the data receiver with its signal detector circuit will detect the component frequency causing contact closure element 12 at the data receiver interface to close. As seen from FIG. 4, the closure of contact element 12 will connect the voltage supply 22 across the relay coil $A_3$ through lines 21 and 33.

From the foregoing it can be seen that for any combination of contact closures performed at the data transmitter, the corresponding contact closures are ultimately obtained at the output of the data receiver which functions to operate the translator circuit through the data receiver output selection circuit and thence the data retrieval circuit to produce the same character designation transmitted by the data transmitter, the character designation being representation of the relative positioning of the wiper contacts or brushes on the surface of the commutator disc or element 1 of the encoder.

Contact closure elements 10, 11, 12 and 13 are representative of the component frequencies found in group *A*. Each of these contact elements is connected in series to the voltage supply 22 and thence through the common line 21 which is connected to one side of each of the relays $A_1$, $A_2$, $A_3$, and $A_4$. The other side of relay $A_1$ is connected by line 31 to its contact element 10 whereas the other side of relay $A_2$ is connected by means of line 32 to its contact element 11. By the same token, relays $A_3$ and $A_4$ are connected from their other sides by way of lines 33 and 34, respectively, to their respective contact elements 12 and 13. This completes the data receiver output selection circuit for group *A*.

It will be noted that the data receiver output selection circuit explained immediately above is identical with respect to contact elements 14, 15, 16 and 17 in group *B*. Each of these contact elements is connected to the voltage supply 24 which is thence connected by lines 23 to one side of each of the relays $B_1$, $B_2$, $B_3$ and $B_4$. The other side of each of the relays $B_1$, $B_2$, $B_3$ and $B_4$ are respectively connected by lines 35, 36, 37 and 38 to their respective elements 14, 15, 16 and 17. Thus, upon closing of any of the contact elements 14 through 17, the voltage supply 24 will energize the respective relay $B_1$ through $B_4$.

As has already been mentioned, group *C* consists of only three possible detected signals which when transmitted will respectively close any one of the contact elements 18, 19 or 20. Each of these contact elements is connected in series with the voltage supply 26 which thence is connected through line 25 to one side of each of the relays $C_1$, $C_2$ and $C_3$. The other side of each of the relays $C_1$, $C_2$ and $C_3$ is respectively connected by lines 41, 42 and 43 to the contact elements 18, 19 and 20 to complete the data receiver output selection circuit for group *C*. The power supplies 22, 24 and 26 may be provided as a single supply if desired.

Although contact closure elements 10 through 20 have been indicated in FIG. 4 as well as in FIG. 5, it should be evident that other circuit components other than a contact closure element may be utilized in performing the necessary functioning required in the data receiver output selection circuits.

The data retrieval circuit is actually part of the translator circuit and is divided into three groups as represented by the plurality of groups of resistances as shown in FIG. 4, each of these groups of resistances having their own voltage supply.

Each of the switching relays $A_1$, $A_2$, $A_3$ and $A_4$ have their respective contactors $S_{A1}$, $S_{A2}$, $S_{A3}$, and $S_{A4}$ all connected in series when the contacts are in their normally closed position designated as contact X, the switching relays $A_1$, $A_2$, $A_3$ and $A_4$ being in their unenergized state.

As can be seen from FIG. 4, the same is true in connection with the group *B* series of switching relays $B_1$ through $B_4$ wherein their contactors $S_{B1}$, $S_{B2}$, $S_{B3}$ and $S_{B4}$ are shown in their normally closed position at contact X. The same is true in connection with group *C* wherein the switching relays $C_1$, $C_2$ and $C_3$ have their respective contactors $S_{C1}$, $S_{C2}$, $S_{C3}$ and $S_{C4}$ in their normally closed positions at contact X. Thus as a result the load resistance $R_L$ is connected by means of line 52 through the contactors $S_{A1}$ through $S_{A4}$, thence through line 46 to and through the contactors $S_{B1}$ through $S_{B4}$, and thence through line 45 to and through the contactors $S_{C1}$, $S_{C2}$ and $S_{C3}$ to line 44 completing the circuit back to resistance $R_L$.

If any one of the switching relays in the group *A*, *B* or *C* is energized so that its respective contactor will be thrown into contact position Y, a resistance and its corresponding voltage drop will be placed in the circuitry in series with the load resistance $R_L$. In the case of group *A*, there is provided the parallel circuit comprising the voltage drop resistances $R_{A1}$, $R_{A2}$, $R_{A3}$ and $R_{A4}$ which are connected across the voltage supply 30 by means of lines 51 and 52. The voltage supply 30 has a constant DC value of $V_A$ volts which is maintained across the group of resistances $R_{A1}$ through $R_{A4}$. Each of the resistances $R_{A1}$ through $R_{A4}$ are of equal value so that the voltage drop across any one of these resistances is one-fourth of the voltage $V_A$. They may be described as functioning as voltage dividers. Depending upon which switching relay $A_1$ through $A_4$ is energized, a voltage drop may be developed across the load resistance $R_L$ equal to one-fourth or one-half or three-fourths or 100 percent of the voltage drop across the entire group of resistances $R_{A1}$ through $R_{A4}$.

With respect to the switching relays $B_1$ through $B_4$ in group *B*, there is also provided a group of resistance $R_{B1}$, $R_{B2}$, $R_{B3}$ and $R_{B4}$ connected by lines 46 and 48 across the voltage supply 40 having an output voltage of $V_B$ imposed across the group of resistances $R_{B1}$ through $R_{B4}$.

By the same token, the voltage supply 50 in group *C* of the group of switching relays $C_1$, $C_2$ and $C_3$ is provided across the group of resistances $R_{C1}$, $R_{C2}$ and $R_{C3}$ with the voltage supply 50 having an output voltage across the entire group of resistances $R_{C1}$ through $R_{C3}$ of $V_C$ volts.

As in the case of group *A* the resistances connected in series in group *B* as well as group *C* are respectively of equal value and likewise representative of the common difference of the progression represented by the group. Thus the voltage drop of any one of the resistances $R_{B1}$ through $R_{B4}$ is one-fourth of $V_B$ whereas the voltage drop with respect to any of the resistances $R_{C1}$ through $R_{C3}$ is one-third of $V_C$.

In operation, if a multifrequency signal is received from the data transmitter, a component frequency of the signal may be selective to energize the signal detector circuit in the data receiver to close a contact closure element such as element 12. Thus, the voltage supply 22 is connected across the switching relay $A_3$, which upon being energized, causes its contactor or pole $S_{A3}$ to move from contact position X to contact position Y. As a result, each of the resistances $R_{A1}$, $R_{A2}$ and $R_{A3}$ connected in series, have heir combined voltage drop connected across the load resistance $R_L$. The circuit through $R_L$ is by way of line 44, thence through each of the contactors $S_{C1}$ through $S_{C3}$ which remain in their normally closed position X, thence through line 45 through each of the normally closed contactors $S_{B1}$ through $S_{B4}$, thence through line 46 through normally closed contactor $S_{A4}$ and thence through contactor $S_{A3}$ in energized position Y through each of the resistances $R_{A3}$, $R_{A2}$ and $R_{A1}$ thence through line 52 back to the load resistance $R_L$. The voltage drop across the resistances $R_{A1}$ through $R_{A3}$, being three-fourths of $V_A$, will appear across the resistance $R_L$. This voltage drop across the load resistance $R_L$ may be visually depicted through an indicating device connected across the load resistance $R_L$ as shown in FIG. 4. The indicating device may be in the form of a voltmeter or other metered device indicative of the analog signal sought to be detected as generated by the analog data source.

Thus, it is clear from the foregoing that FIG. 4 represents a translator circuit which is an integrated decoding network comprising a data retrieval circuit which produces discrete voltages when integrated together in accordance with the code of the present invention, represent the original analog signal coded and transmitted by way of a multifrequency signal over the telemetry system. When the transmitted frequency signal is detected by the signal detector circuit of the data receiver, a contact closure is produced by the detector circuit, which contact closure is utilized in a data receiver output selection circuit to operate a switching relay which in turn operates an integrated voltage circuit comprising a plurality of groups of resistances wherein each resistance found within each of these groups *A*, *B* and *C* are of identical value and each serially connected group is connected in series to its respective DC voltage supply. Each of the groups of resistances are connected in series with each other when connected into use by their corresponding switches so that upon operation of the network of relays in the data receiver output selection circuit, a series of integrated voltages may be additively obtained from each of the groups *A*, *B* and/or *C*. The voltage drops across the resistances in these groups will appear also across the load resistance $R_L$.

As previously explained in connection with FIGS. 2 and 3, the integers represented by each of the respective groups *A*, *B* and *C* may be reproduced in the form of voltage drops across the series of resistances in each of the groups of resistances found in the circuit of FIG. 4. Thus, the resistances $R_{A1}$ through $R_{A4}$, being equal in valve, can be selected to have a value so that the voltage drop across any one of these resistances will be equal to 20 volts and thus the voltage drop $V_A$ will be equal to 80 volts. This is representative of the integers as shown in FIG. 2 wherein tracks $A_1$ through $A_4$ represent integers 20, 40, 60 and 80, respectively. Thus, for example, a contact closure in track $A_1$ at the transmitting station will mean a contact closure 10 at the receiving station thereupon energizing switching relay $A_1$ placing the resistance $R_{A1}$ in the circuit of $R_L$. The voltage drop across the resistance $R_{A1}$ is equal to one-fourth of $V_A$ which is 80 volts. Therefore, the voltage drop across resistance $R_{A1}$ is 20 volts which is also the voltage drop across the load resistance $R_L$. Assuming that the indicating device is a voltmeter, the voltmeter will read 20 volts indicating that the encoder 1 was in a position wherein track $A_1$ on the commutator disc provided for a contact closure at the data input terminal of the data transmitter or at discrete position 20 of angular displacement.

In order to reproduce the integers of 0 through 99 through the means of the integrated voltage circuit of FIG. 4, only one switching relay in each of the groups *A*, *B* and *C* can be permitted to be energized at any one instance. Thus, for any given multifrequency signal, switching relay $A_2$ may be selectively energized as well as a switching relay from group *B* and group C. However, switching relay $A_2$ cannot be energized simultaneously with switching relay $A_4$ or any other switching relay of that group under normal operating conditions unless muting is employed as previously described for additional information.

FIG. 5 is another decoding network and representative of other types of circuitry that may be used to translate the detected signal composed at the data receiver interface by means of the contact closure elements 10 through 20. It will be noted in FIG. 5 that the switching means used in the decoding network are a series of transistors rather than switching relays. As is well known, the transistor is a well known switching device and may be reversed biased in order to maintain the transistor in an off state, that is maintaining its operation in the cut off region. The transistor devices are turned fully on by the operation of a forward biasing on the base of the transistor so that the transistor is operating in its saturation region.

As shown in FIG. 5, as in the case of FIG. 4, there is a data receiver interface having contact closures elements 10 through 20.

It should be noted at the outset that the decoding or translator network of FIG. 5 need not be divided into a series of groups as in the case of FIG. 4, since an integrated voltage circuit is not being utilized in the decoding network of FIG. 5.

As shown in FIG. 5, each of the contact closure elements 10 through 20 are connected to line 58 to the forward biasing voltage supply 60 which in turn is connected through the resistance 61 to line 76 which is connected to the emitter of each of the transistors $T_1$ through $T_{11}$. Line 76 is also connected to the positive side of voltage supply 76 of the data retrieval circuit. The resistance 61 connected in series with the forward biasing voltage supply 60, guards against superconduction across the emitter-base junction of each of the transistors $T_1$ through $T_{11}$.

The other side of each of the contact closure elements 10 through 20 are respectively connected by lines 80 through 90 to the bases of each of the transistors $T_1$ through $T_{11}$ respectively.

A reverse bias voltage supply is provided across the emitter-base junction of each transistor and this reverse bias voltage supply is indicated at 62 through 73 for each of the respective transistors $T_1$ through $T_{11}$. As already indicated above, the reverse bias voltage supplies 62 through 73, are operative to maintain the transistors $T_1$ through $T_{11}$ in the cutoff region. The forward bias voltage supply 60 being of greater magnitude will overcome the reverse bias voltage supply of any one of said voltage supplies 62 through 73 in order to place the transistor in operation in its saturation region.

It should be noted that the reverse bias voltage supplies may be taken from a single voltage supply source.

Each of the collectors of the transistors $T_1$ through $T_{11}$ are respectively connected through the dropping resistances $R_1$ through $R_{11}$, each of which are in turn connected through line 75 to the load resistance $R_L$. Load resistance $R_L$ is thence connected to the negative terminal of the voltage supply 74 of the data retrieval circuit.

Although as a switching device, PNP transistors are shown in FIG. 5, it is also evident that NPN type transistors may be utilized to perform the switching function.

The dropping resistances $R_1$ through $R_{11}$ have resistance values which produce a voltage drop value proportional to the voltage output at each particular transistor. A current flowing through any one of the transistors operating in its saturation region will also cause a current flow through the resistance $R_L$. The voltage drop across $R_L$ will be indicative of the original analog signal transmitted via the telemetry system.

In operation, a contact closure element such as 14 may be caused to close in view of a component frequency signal received in the multifrequency signal transmission and detected by the data receiver. The closure of contact element 14 places the forward biasing voltage supply 60 across the emitter and base of transistor $T_5$ by means of lines 76 and 84. The forward biasing causes the transistor $T_5$ to conduct or operate in its saturated region with a resultant current flow through resistance $R_5$ induced by voltage supply 74. This voltage drop across $T_5$ and $R_5$ is also placed across the load resistance $R_L$. The indicating device connected across the load resistance $R_L$ will indicate the value of the voltage drop.

Transistors $T_1$ through $T_4$ correspond to signals received in connection with the group *A* analog values of the code described in reference to FIG. 2. Transistors $T_5$ through $T_8$ correspond to the signals received in connection with group *B*. Group *C* is represented by the transistors $T_9$, $T_{10}$ and $T_{11}$. As stated previously in reference to the code, the maximum of one contact closure in each respective contact closure group, namely 10 through 13; 14 through 17; and 18 through 20, will be permitted at any one time.

When a corresponding transistor R is switched on in more than one of the aforementioned groups, the summation of the current values through each of the respective activated dropping resistors and transistors of each group, flows through the load resistance $R_L$. This relationship is apparent from the fact that the dropping resistances $R_1$ through $R_{11}$ are connected in parallel with each other when their respective transistors are conducting and that the source 74 is a constant voltage source. Thus, the indicating device indicates the corresponding analog value as a voltage $V_L$ which is analogous to the original analog signal sent from the analog data source.

The values of the dropping resistances $R_1$ through $R_{11}$ are selectively chosen to provide the proper current flow, the value of which is indicative of the corresponding analog value coded by the encoder. Assuming that the constant voltage supply 74 is equal to $V_S$ and the voltage supply across the load resistance is $V_L$ with the voltage drop across a selected one $R_R$ of the dropping resistances $R_1$ through $R_{11}$ being represented by $V_R$, and the voltage drop across any one of the transistors $T_1$ through $T_{11}$ being $V_T$, then $$V_S=V_L+V_R+V_T$$

Assuming the voltage across the transistors $T_1$ through $T_{11}$ negligible for all practical purposes ($V_T=0$), because of the low resistance when the transistor is operating in the saturation region, then $$V_L=V_S-V_R=V_S-R_RR_R$$

where $V_R=I_RR_R$

From this formula it is evident that for each given increased value in the analog value $V_L$ to be indicated, there must be a corresponding reduction in the set value of $V_R$ for the said one respective dropping resistance, as $I_R$ remains constant. In other words, as the analog value represented by $V_L$ increases, the respective dropping resistors must decrease in resistance to sufficiently increase the current flow $I_L$ through load $R_L$ to obtain the higher value of $V_L$ desired. This is accomplished by switching another dropping resistor, $R_1$ through $R_{11}$, in parallel with the selected one $R_R$, which has the combined effect of providing a total resistance less than $R_R$. This is unlike the circuit of FIG. 4 where the permanent or set value of group resistances $R_a$, $R_B$ and $R_C$ must increase proportionately with each increased analog value of $V_L$ as the translator circuit of FIG. 4 operates by the summation of voltages in accordance with the code of the present invention and the circuit of FIG. 5 operates by the summation of currents in accordance with the code.

Assuming that each respective and different current flow through dropping resistances $R_1$ through $R_4$, are respectively indicative of the analog values across $R_L$ at 20, 40, 60 and 80, and that the currents through resistances $R_5$ through $R_8$ are representative of the analog values 1, 2, 3 and 4, and with the analog values represented by the respective biasing resistances $R_9$, $R_{10}$ and $R_{11}$ being 5, 10 and 15, it is evident that the highest analog integer must be represented by the lowest resistance value R and the lowest represented integer requires the highest corresponding resistance with intermediate resistance values ranging accordingly and sequentially.

From the foregoing description of FIGS. 4 and 5, it is evident that various forms of translator circuits may be used in order to convert the distinct coded multifrequency signals received over the telemetry link into separate component frequencies which in turn are translated into the original analog signal sent from the analog data source. The detector circuit in the data receiver causes a series of selective contact closures which are reported to the data receiver interface, these contact closures being part of the circuitry of the translator circuit. The translator circuit upon closure of selected of these contact closures is placed into operation producing an output signal, the analog value of which is indicative of the information character represented by the transmitted multifrequency signal, this output signal being suitable for registration in an output analog indicating device connected directly to the translator or for computer input.

I claim:

1. An analog converter to convert analog signals into coded combinations of contact closures for initiation of corresponding telemetry signals, a coded pattern member having a plurality of parallel tracks, each track having a series of areas extending therealong which are alternately on and off to a selected type of energy to be supplied thereto, sensing means having a series of sensing elements simultaneously movable as a unit relative to said first member in proportional response to a phenomenon to be measured and positioned such that each track has one numbers scribed element for movement therealong over said areas to independently sense the on or off condition of said energy in each respective track and accordingly make a contact closure in response to the sensing of a preselected one of said conditions, said tracks divided into a plurality of groups and each of said groups having its on and off areas for each track arranged with respect to those in each other rack in the same group such that no more than one of said contact closures is permitted within each group at the same time, said on and off areas being further arranged with respect to each other and said sensing elements by the formula of conditions wherein each of said tracks and accordingly its respective contact closure is ascribed a different natural number in such a manner that said groups are accordingly ascribed as successive series of arithmetic progressions of natural numbers wherein the first term of each successive group progression equals the last term of the preceding group progression plus the common difference of said preceding progression and wherein the common difference of each successive group progression is equal to its first term and the addition of the natural numbers scribed to any contact closures made simultaneously at each possible predetermined different increment of relative position between said member and said elements provides an arithmetic progression of natural numbers corresponding to the range of analog values to be converted.

2. The analog converter of claim 1 characterized by means to produce a different telemetry signal for each respective different corresponding contact closure.

3. The analog converter of claim 2 characterized by a translator network for conversion of said different coded telemetry signals into corresponding analog signals, comprising switch means responsive with the reception of said coded signals to provide voltage drops across a load resistance, the sum of which is representative of the original converted analog signal valve.

4. The analog converter of claim 1 wherein the number of said groups is selected to equal the number of channels available for transmission on a transmission system to be employed with said converter.

5. The analog converter of claim 1 characterized in that said tracks are annular and concentric with tracks of the same group lying adjacent each other, said groups being concentrically and sequentially arranged according to their respective ascribed common difference with the group of the highest common difference positioned closest to the center.

6. The analog converter of claim 1 characterized by three of said groups wherein their ascribed arithmetic progressions have common differences of one, five and 20 respectively.

7. The analog converter of claim 3 characterized in that said switch means is operable to selectively connect and disconnect resistances of preselected value in series with each other and said load resistance, and power supply means connected with said resistances to provide voltage drops thereacross.

8. The analog converter of claim 3 characterized in that said switch means is operable to selectively connect and disconnect resistances of preselected value in parallel with each other and said load resistance, and power supply means connected with said resistances to provide voltage drops thereacross.

9. An analog-to-digital encoder for the conversion of analog signals in the form of angular shaft displacement into representative combinations of contact closures for initiation of corresponding telemetry signals comprising a disc having a preselected pattern of nonconductive and electrically connected conductive segments positioned in eleven annular tracks thereon, said segments defined by annular concentric circles and concentric radii providing 100 discrete positions of angular displacement, each of said tracks having a brush contact mounted for relative movement therealong to produce combinations of contact closures with said conductive segments indicative of the corresponding angular displacement of said disc to produce corresponding telemetry signals, said tracks divided into three groups with said conductive and nonconductive segments arranged such that no more than one contact closure is permitted in each group for each given discrete position of angular displacement, said segments being further arranged according to the conditions that each contact is ascribed with a different integer and said ascribed integers when added for each of said discrete positions provide an arithmetic progression of integers 0 through 99 with a common difference of one.

UNITED STATES PATENT OFFICE
CERTIFICATE OF CORRECTION

Patent No. 3,594,764 Dated July 20, 1971

Inventor(s) Matthew John Walsh

It is certified that error appears in the above-identified patent and that said Letters Patent are hereby corrected as shown below:

Column 19, Claim 1, line 25, "numbers scribed" should read --sensing--; line 33, "rack" should read --track--; line 46, "scribed" should read --ascribed--; Column 20, Claim 3, line 7, "valve" should read --value--.

Signed and sealed this 14th day of March 1972.

(SEAL)
Attest:

EDWARD M.FLETCHER,JR.
Attesting Officer

ROBERT GOTTSCHALK
Commissioner of Patents